US011031043B1

(12) United States Patent
Avetisyan et al.

(10) Patent No.: US 11,031,043 B1
(45) Date of Patent: Jun. 8, 2021

(54) VIDEO COLLABORATION TOOL

(71) Applicant: Facebook, Inc., Menlo Park, CA (US)

(72) Inventors: Vardges Avetisyan, Jersey City, NJ (US); Dobromir Ankov Yordanov, Hoboken, NJ (US); Paige Regalado, Brooklyn, NY (US); Christopher Melamed, Brooklyn, NY (US); Brittany Mennuti, South Orange, NJ (US); Rishabh Aggarwal, San Francisco, CA (US); Harry Sanabria, Mountain View, CA (US); Shu Yu Ke, Union City, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 16/867,444

(22) Filed: May 5, 2020

(51) Int. Cl.
*G11B 27/036* (2006.01)
*H04N 5/92* (2006.01)

(52) U.S. Cl.
CPC ......... *G11B 27/036* (2013.01); *H04N 5/9205* (2013.01)

(58) Field of Classification Search
CPC ............................ G11B 27/036; H04N 5/9205
See application file for complete search history.

(56) References Cited

U.S. PATENT DOCUMENTS

| 2003/0031460 A1* | 2/2003 | Obrador | G11B 27/105 |
| | | | 386/230 |
| 2018/0005665 A1* | 1/2018 | Knutt | G11B 27/031 |

FOREIGN PATENT DOCUMENTS

WO    2014033357 A1    3/2014

OTHER PUBLICATIONS

"Acapella from PicPlayPost" via YouTube, Sep. 15, 2015, <https://www.youtube.com/watch?v=_STHaA2iHfg>.
(Continued)

*Primary Examiner* — Thai Q Tran
*Assistant Examiner* — Jose M Mesa
(74) *Attorney, Agent, or Firm* — Sheppard Mullin Richter & Hampton LLP

(57) ABSTRACT

A video collaboration tool is provided that, in some embodiments, features a non-transitory machine-readable storage medium encoded with instructions executable by a hardware processor of a computing component, the machine-readable storage medium comprising instructions to cause the hardware processor to perform a method for an electronic device comprising: repeatedly playing a video clip having a predetermined duration; capturing video of a user of the electronic device while repeatedly playing the video clip; automatically generating a plurality of takes of the video of the user, wherein each take has the predetermined duration of the video clip; and responsive to input of the user: selecting one of the takes, and synchronously playing the selected take and the video clip.

30 Claims, 11 Drawing Sheets

(56) References Cited

OTHER PUBLICATIONS

"PicPlayPost Video Editor, Slideshow, Collage Maker," Mar. 16, 2020, Google Play App Store, <https://play.google.com/store/apps/details?id=com.flambestudios.picplaypost&hl=en>.

"Video Collage and Photo Grid," Apkpure, Mar. 18, 2020, <https://apkpure.com/es/video-collage-mix-video-photo/com.llapps.videocollage>.

"Video Collage Mix Video & Photo," Apple App Store Preview, Mar. 16, 2020, <https://apps.apple.com/us/app/video-collage-and-photo-grid/id779353036>.

"Loop Recording on Audio Tracks." PreSonus Audio Electronics, Inc., Mar. 16, 2020, <https://s1manual.presonus.com/Content/Recording_Topics/Loop_Recording_on_Audio_Tracks.htm>.

\* cited by examiner

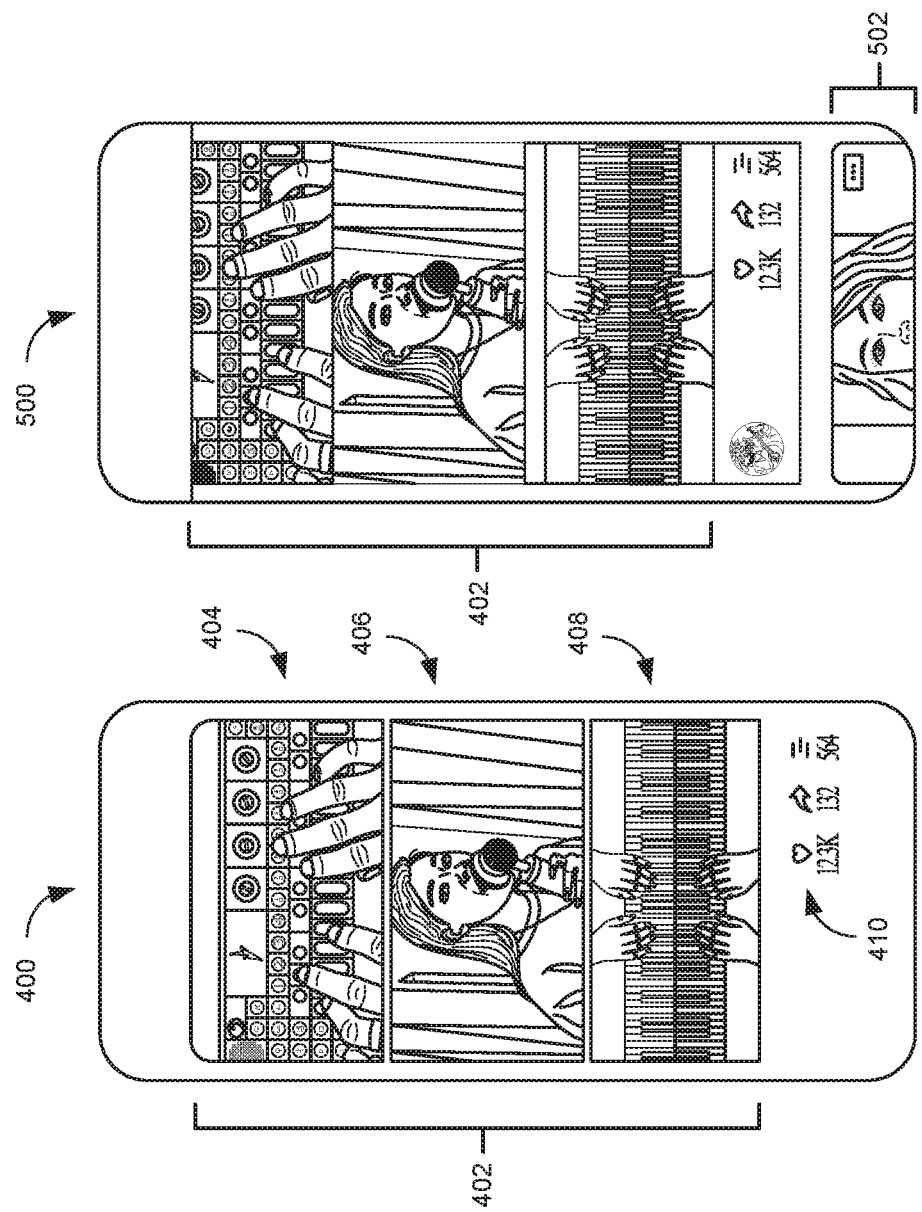

VIDEO COLLABORATION TOOL

FIELD OF THE INVENTION

The present disclosure relates generally to making and using videos.

SUMMARY

In general, one aspect disclosed features a non-transitory machine-readable storage medium encoded with instructions executable by a hardware processor of a computing component, the machine-readable storage medium comprising instructions to cause the hardware processor to perform a method for an electronic device comprising: repeatedly playing a video clip having a predetermined duration; capturing video of a user of the electronic device while repeatedly playing the video clip; automatically generating a plurality of takes of the video of the user, wherein each take has the predetermined duration of the video clip; and responsive to input of the user: selecting one of the takes, and synchronously playing the selected take and the video clip.

Embodiments of the medium may include one or more of the following features. In some embodiments, the method comprises playing the captured video of the user while capturing the video of the user. In some embodiments, the method comprises obtaining the video clip from a collaboration library hosted on a remote collaboration server. In some embodiments, the method comprises publishing a collaboration to the collaboration library, comprising: uploading the selected take to the collaboration library, and associating the selected take with the video clip. In some embodiments, the method comprises publishing a collaboration to social media of the user, comprising: adding one or more links to the social media of the user, wherein the one or more links reference the video clip and the selected take in the collaboration library. In some embodiments, the method comprises, responsive to second input of the user: selecting a second music video clip, wherein the second music video clip has the predetermined duration of the music video clip, wherein the music video clip and the second music video clip have the same beats per minute, and wherein the music video clip and the second music video clip are associated with a same piece of music, and repeatedly and synchronously playing the music video clip and the second music video clip. In some embodiments, the method comprises, responsive to second input of the user: replacing the music video clip with a second music video clip, wherein the music video clip is associated with a first piece of music, wherein the second music video clip is associated with a second piece of music, and wherein the first piece of music is different from the second piece of music, and repeatedly and continuously playing the second music video clip. In some embodiments, repeatedly playing a video clip having a predetermined duration comprises: starting playback of images of the video clip later than playback of sound of the video clip, by an amount substantially equal to an input latency of a headset worn by the user. In some embodiments, capturing video of a user of the electronic device comprises: starting capture of images of the user later than starting capture of sound of the user, by an amount substantially equal to an output latency of a headset worn by the user. In some embodiments, the method comprises, responsive to detecting a tap on the video clip, displaying metadata for that clip.

In general, one aspect disclosed features an electronic device, comprising: a hardware processor; and a non-transitory machine-readable storage medium encoded with instructions executable by the hardware processor to perform a method comprising: repeatedly playing a video clip having a predetermined duration; capturing video of a user of the electronic device while repeatedly playing the video clip; automatically generating a plurality of takes of the video of the user, wherein each take has the predetermined duration of the video clip; and responsive to input of the user: selecting one of the takes, and synchronously playing the selected take and the video clip.

Embodiments of the electronic device may include one or more of the following features. In some embodiments, the method comprises playing the captured video of the user while capturing the video of the user. obtaining the video clip from a collaboration library hosted on a remote collaboration server. In some embodiments, the method comprises publishing a collaboration to the collaboration library, comprising: uploading the selected take to the collaboration library, and associating the selected take with the video clip. In some embodiments, the method comprises publishing a collaboration to social media of the user, comprising: adding one or more links to the social media of the user, wherein the one or more links reference the video clip and the selected take in the collaboration library. In some embodiments, the method comprises responsive to second input of the user: selecting a second music video clip, wherein the second music video clip has the predetermined duration of the music video clip, wherein the music video clip and the second music video clip have the same beats per minute, and wherein the music video clip and the second music video clip are associated with a same piece of music, and repeatedly and synchronously playing the music video clip and the second music video clip. In some embodiments, the method comprises, responsive to second input of the user: replacing the music video clip with a second music video clip, wherein the music video clip is associated with a first piece of music, wherein the second music video clip is associated with a second piece of music, and wherein the first piece of music is different from the second piece of music, and repeatedly and continuously playing the second music video clip. In some embodiments, repeatedly playing a video clip having a predetermined duration comprises: starting playback of images of the video clip later than playback of sound of the video clip, by an amount substantially equal to an input latency of a headset worn by the user. In some embodiments, capturing video of a user of the electronic device comprises: starting capture of images of the user later than starting capture of sound of the user, by an amount substantially equal to an output latency of a headset worn by the user. In some embodiments, the method comprises responsive to detecting a tap on the video clip, displaying metadata for that clip.

In general, one aspect disclosed features a computer-implemented method for an electronic device, the method comprising: repeatedly playing a video clip having a predetermined duration; capturing video of a user of the electronic device while repeatedly playing the video clip; automatically generating a plurality of takes of the video of the user, wherein each take has the predetermined duration of the video clip; and responsive to input of the user: selecting one of the takes, and synchronously playing the selected take and the video clip.

Some embodiments of the computer-implemented method comprise playing the captured video of the user while capturing the video of the user. Some embodiments comprise obtaining the video clip from a collaboration library hosted on a remote collaboration server. Some embodiments comprise publishing a collaboration to the collaboration library, comprising: uploading the selected take to the collaboration library, and associating the selected take with the video clip. Some embodiments comprise publishing a collaboration to social media of the user, comprising: adding one or more links to the social media of the user, wherein the one or more links reference the video clip and the selected take in the collaboration library. Some embodiments comprise responsive to second input of the user: selecting a second music video clip, wherein the second music video clip has the predetermined duration of the music video clip, wherein the music video clip and the second music video clip have the same beats per minute, and wherein the music video clip and the second music video clip are associated with a same piece of music, and repeatedly and synchronously playing the first and second music video clips. Some embodiments comprise, responsive to second input of the user: replacing the music video clip with a second music video clip, wherein the second music video clip is associated with a second piece of music, and wherein the first piece of music is different from the second piece of music, and repeatedly and continuously playing the second music video clip. In some embodiments, repeatedly playing a video clip having a predetermined duration comprises: starting playback of images of the video clip later than playback of sound of the video clip, by an amount substantially equal to an input latency of a headset worn by the user. In some embodiments, capturing video of a user of the electronic device comprises: starting capture of images of the user later than starting capture of sound of the user, by an amount substantially equal to an output latency of a headset worn by the user. Some embodiments comprise, responsive to detecting a tap on the video clip, displaying metadata for that clip.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 is an example screenshot produced by the collaboration tool in the feed mode according to some embodiments of the disclosed technology.

FIG. 5 is an example screenshot produced by the collaboration tool in the feed mode in response to a vertical swipe up according to some embodiments of the disclosed technology.

Figure 1:
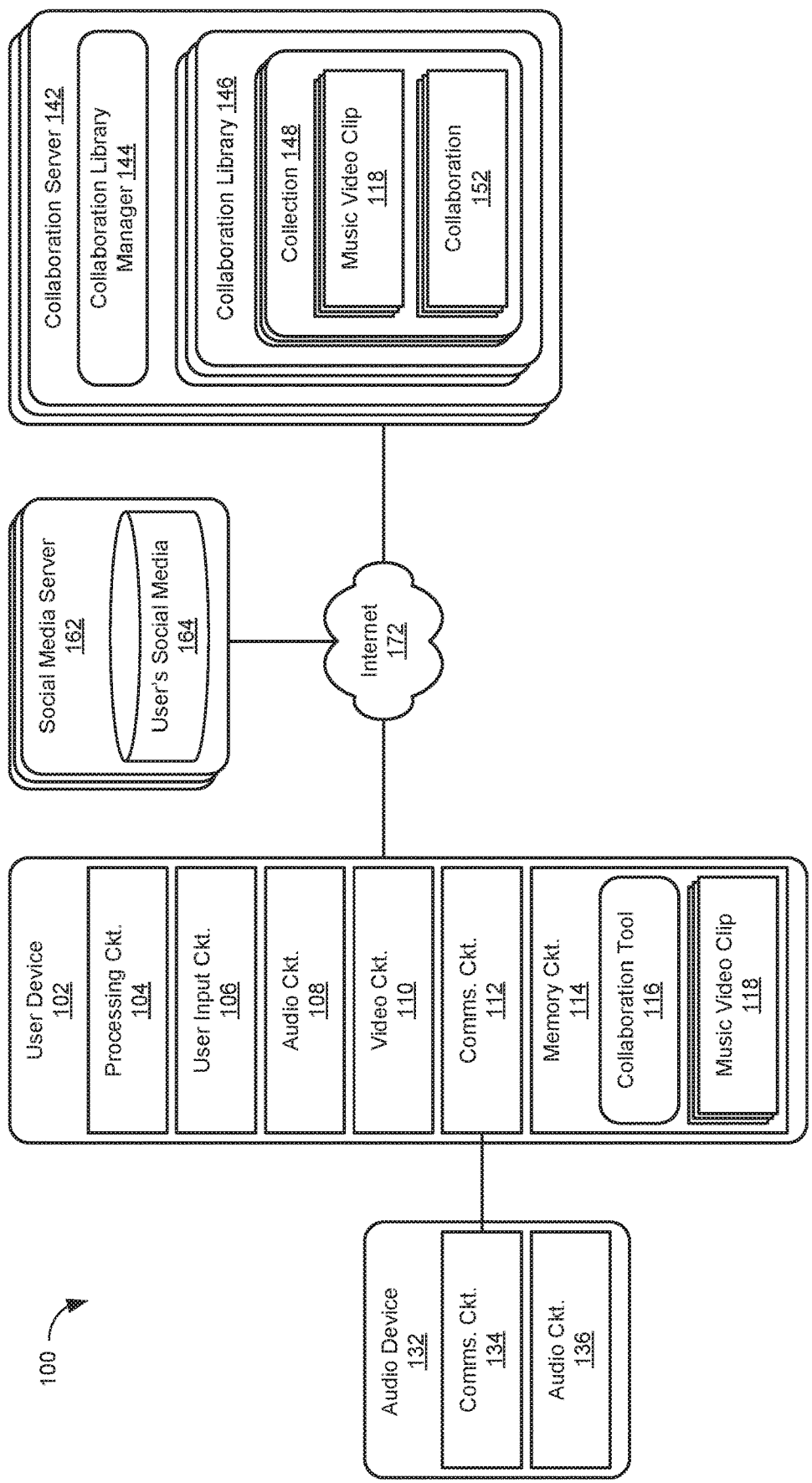
FIG. 1 depicts a block diagram of an example system for making and using music video collaborations according to some embodiments of the disclosed technology.

The figures are not exhaustive and do not limit the present disclosure to the precise form disclosed.

DETAILED DESCRIPTION

Enjoying music videos has long been a source of entertainment for music fans. The availability of low-cost Web-Cams, microphones, mobile phones with video-recording capabilities, and broadband connections now allows video enthusiasts to create and share their own videos. This technology also allows people to combine multiple videos, for example to combine videos of individual musicians performing the same song. For example, a user might combine four such videos into a single video with four panes, with each pane containing one of the videos. In such videos, users can collaborate on vocal ensembles or piece together instrumental components of a song.

While this content format shows promise, current tools for creating such videos are difficult to use. First the user must create multiple videos, or coordinate the recording of multiple videos with collaborators. Each video must be timed well with the previously recorded video to ensure all videos are keeping the same time. Then the user must stitch those videos together using a desktop video editing tool, adjust the volume and audio of the clips, align them so the timing across the videos makes sense, and format the layout of the component videos to be visually compelling. Finally, the user must export the resulting creation to a format that is suitable for sharing, share the video on the user's preferred network, and draw attention to it. These difficulties inherently limit the number of creators of such content because the process requires access to, and knowledge of, complex video editing software. Furthermore, the time investment can be considerable, with some well-known creators reporting hundreds of hours of video-editing time.

Various embodiments of the disclosed technology address these difficulties, providing a simple and fun tool for creating collaborative videos in only minutes. The disclosed collaboration tool can be used quickly and without any special knowledge on any computer, smart phone, or similar electronic device. For clarity and concision of description, embodiments for making and using music videos are described. However, it should be understood that the disclosed technology applies to any type of video, for example including comedy, visual arrangements, beauty, dance, and any other type of video that can benefit from synchronization of multiple videos from different contributors.

In the disclosed embodiments, a library hosted by a remote server stores collections of music video clips, where all of the music video clips in one collection have the same duration, and are associated with a particular piece of music. As used herein, the term "video" is used to denote a combination of images and sound, for example such as images and sound of a musician performing. A user may use the tool, which may be implemented on an electronic device, such as a smart phone, to select one or more of the music video clips. In response, the collaboration tool downloads the selected music video clips, and loops and displays the downloaded music video clip(s) according to the minimum duration across all clips. In the case of multiple downloaded music video clips, the collaboration tool loops and displays the clips in unison, such that they are synchronized. For example, for a particular song, the user may use the tool to download and display one clip of a drummer playing the chorus of a song, and another clip of a singer singing the chorus. In this example, because the two clips are displayed synchronized, the drummer and singer appear to be playing together on the collaboration tool user interface.

The app may operate in a mixing mode, where the user can use the user interface to swap out the clips for other clips. Continuing the above example, the user can replace the drummer with a bass player, also playing the chorus of the song. When the user is happy with the clips that are looping, the user can then publish the combination of the clips as a collaboration. For example, the user can cause the app to upload the collaboration to the collaboration library. Other users of the collaboration tool can find and enjoy the collaboration in the collaboration library. The user can also advertise the collaboration in other ways, for example by exporting or linking to the collaboration and sharing it to the user's social network. The collaboration tool has numerous other features, which are described in detail below.

In some embodiments, a user may export the collaboration in a format suitable for sharing the collaboration to other platforms. For example, the user may export the collaboration in a rendered format, where the clips are joined together.

The app may operate in a recording mode, where the user can record a music video clip to go with the looping clips. As those clips continuously loop, the app may record the user singing and/or playing a musical instrument, for example with the smart phone's front-facing or rear-facing camera, and may display the recording along with the looping clips. The user can record for as many repetitions of the looping clips as desired.

When the user stops recording, the collaboration tool may automatically segment the recording into takes, each having the same duration as the looping clips, and being synchronized with them. The user can then create a collaboration by selecting one of the takes, which the tool may associate with the downloaded clips. The user can then publish the collaboration. For example, the user can cause the app to upload the selected take to the collaboration library, where it is associated with the downloaded clips, which of course are still stored in the collaboration library. Other users of the collaboration tool can find, play back, and enjoy the collaboration in the collaboration library, and can download the selected take to use in their own collaborations. The user can also advertise the collaboration, for example as described above. The collaboration tool has numerous other features, which are described in detail below.

FIG. 1 depicts a block diagram of an example system 100 for making and using music video collaborations according to some embodiments of the disclosed technology. While some embodiments may employ all of the depicted elements of system 100, it should be understood that other embodiments may employ less than all of the depicted elements.

Referring to FIG. 1, the system 100 may include any number of user devices 102. A user device 102 may be implemented as any sort of device capable of performing the functions described herein for the user device 102. For example, the user device 102 may be implemented as a smart phone, tablet, laptop, automotive head unit, dedicated media player, and the like.

The user device 102 may include a processing circuit 104. The processing circuit 104 may be implemented as any circuit capable of performing the functions described herein. For example, the processing circuit 104 may be implemented as a microprocessor, microcontroller, and the like.

The user device 102 may include a user input circuit 106. The user input circuit 106 may be implemented as any sort of circuit capable of receiving user input and providing corresponding control signals to the processing circuit 104. For example, the user input circuit 106 may be implemented as a touchscreen, keyboard, mouse, trackball, joystick, and the like, or any combination thereof.

The user device 102 may include an audio circuit 108. The audio circuit 108 may be implemented as any circuit capable of rendering audio as sound. As used herein, the term "audio" is used to refer to a signal that represents sound. For example, the audio circuit 108 may include a speaker, or the like.

The user device 102 may include a video circuit 110. The video circuit 110 may be implemented as any circuit capable of rendering video as images. For example, the video circuit 110 may include a display, touchscreen, or the like.

In some embodiments, the user device 102 may include a communications circuit 112 to communicate with an audio device 132. The communications may be wired or wireless. For example, the audio device 132 may be implemented as a Bluetooth headset, corded earbuds, and the like. Accordingly, the communication circuit 112 may be implemented as a Bluetooth transceiver, wired communications interface, and the like.

The user device 102 may include a memory circuit 114. The memory circuit 114 may store a collaboration tool 116. The memory circuit 114 may be implemented as any memory. In a user device 102 such as a smart phone, the collaboration tool 116 may be implemented as an app. In a user device 102 such as a laptop, the collaboration tool 116 may be implemented as a browser extension that works in cooperation with a web browser. Of course, the collaboration tool 116 may be implemented in other ways in these and other devices. The memory circuit 114 may also store one or more music video clips 118.

The audio device 132 may include a communications circuit 134 to communicate with the user device 102. The audio device 132 may include an audio circuit 136. The communications circuit 134 and the audio circuit 136 of the audio device 132 may be implemented in a similar manner to that described above for the communication circuit 112 and the audio circuit 108 of the user device 102, respectively. One or all components of the audio device may be built into the user device, for instance as a built-in microphone and speaker.

The system 100 may include one or more collaboration servers 142. Each collaboration server 142 may include one or more collaboration libraries 146. The collaboration libraries may be managed by a collaboration library manager 144. Each collaboration library 146 may store one or more collections 148. Each collection 148 may be associated with a particular piece of music, for example such as a song, melody, rhythm, and the like, or any portion thereof. Each collection 148 may store one or more music video clips 118 associated with that collection's piece of music, and one or more collaborations 152 that use one or more of those music video clips 118. Within a collection 148, all of the music video clips 118 have the same duration and tempo, and start and stop at the same places in the associated piece of music. The tempo may be described in beats-per-minute (BPM). All of the music video clips 118 within a collection 148 may be associated with a particular key, and may share other features, for example such as musical style, and the like. The similarities between the music videos clips 118 in a collection 148 allow them to be enjoyed together in any combination. And as noted above, users can publish their own music video clips 118 to the collection.

The system 100 may include one or more social media servers 162. A social media server 162 may store the user's social media 164. The user's social media 164 may be stored in any manner capable of supporting the functions described herein. For example, the user's social media 164 may be implemented as a network-connected database, or the like. As used herein, the term "social media" includes any media provided by any social network used by the user. For example, social media may include information regarding and/or provided by the user and other users in the user's social network, referred to herein as "friends." Social media may include social content, social signals, and the like. Social content may include content shared by the user or a friend, for example such as videos, photos, articles, comments on shared media, and the like. Social content may include events shared by the user or a friend, messages sent by the user or a friend, and the like. Social content may include messages generated automatically by a social network, such as "Your friend got engaged", "Your friend has a birthday", and the like. Social signals may include indications of interactions of the user or a friend with social content. For example, social signals may indicate whether a friend liked a particular post, whether a friend shared the post, how many times the post has been liked, viewed, shared, and the like. Social signals may include any information describing a social network. For example, social signals may include information regarding a social media group to which the user or a friend belongs.

The system 100 may include a network 172 over which the client devices 102, collaboration server(s) 142, and social media server(s) 162 may communicate. The network 172 may be implemented as any network(s) capable of supporting the communications described herein. For example, the network 172 may be implemented using the Internet.

Figure 2:
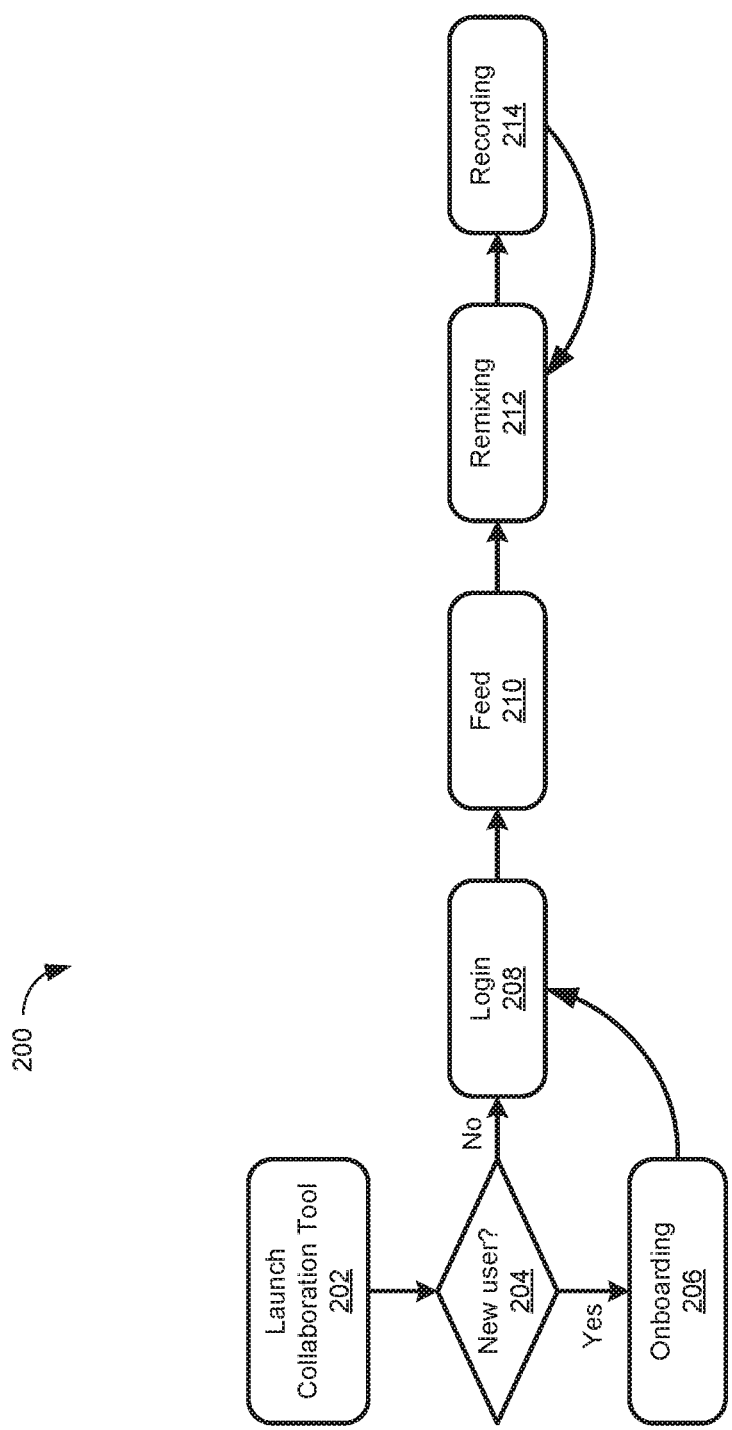
FIG. 2 depicts a process for using a music video collaboration tool according to some embodiments of the disclosed technology.

FIG. 2 depicts a process 200 for using a music video collaboration tool according to some embodiments of the disclosed technology. While the elements of the processes disclosed herein are presented in a particular arrangement, it should be understood that one or more of the elements may be omitted, performed in a different order, performed concurrently, and the like. The process 200 may be performed by one or more elements of the example system 100 of FIG. 1.

Referring to FIG. 2, the process 200 may include launching the collaboration tool, at 202. For example, a user of a smart phone may install the collaboration tool as an app, and then launch that app by tapping an icon for the app. As another example, a user of a laptop may install the collaboration tool as a browser extension, and then launch that browser extension by clicking on an icon for the extension. As yet another example, the tool may be implemented within a website users can access with a browser.

If the user is not a new user, at 204, the tool may allow the user to log in, at 208. But if the user is a new user of the collaboration tool, at 204, then the tool may perform onboarding of the user, at 206. For example, the collaboration tool may allow the user to create an account, login credentials, and the like. Following onboarding, the tool may allow the user to log in, at 208. Following login, the tool may allow a new user to create a profile, agree to terms and conditions of the tool, and the like. As part of creating the profile, the user may upload a profile photo, establish a username, enter a short bio, and the like. In some embodiments, a user may log in using a social media account.

Following login, the tool enters a "feed" mode, at 210. In the feed mode, the tool displays various collaborations. Each collaboration includes one or more music video clips for a particular piece of music. In some embodiments, the collaboration tool may automatically load a collaboration. For example, the collaboration may be the last collaboration viewed by the user, a popular collaboration, a collaboration that is algorithmically selected based on the user's interests, or the like. The tool may allow the user to select the collaboration. Responsive to the user selecting a collaboration, the tool enters a "remixing" mode, at 212. In the remixing mode, the tool allows the user to swap out one or more of the music video clips for other music video clips associated with the same particular piece of music. At any time in the remixing mode, the user may elect to contribute a recording to the collaboration. Responsive to such an election, the tool enters a "recording" mode, at 214. In the recording mode, the tool allows the user to replace one of these video clips by recording one or more "takes" while playing along with the other looping music video clips. The user may stop the recording at any time. Responsive to the user stopping the recording, the tool returns to the remixing mode, at 212. In the remixing mode, the tool allows the user to select a recorded take for inclusion in a collaboration. The tool also allows the user to swap out the other music video clips in the collaboration for other music video clips associated with the same particular piece of music. When the user is happy with the collaboration, the user may elect to publish the collaboration. Responsive to such an election, the tool may publish the collaboration to one or more of the collaboration libraries 146. At this point, the collaboration is available or other users to enjoy and modify to create their own collaborations. The tool also allows the user to advertise the collaboration in the user's social media 164, for example by creating links to the collaboration in the social media 164. Each of these tool modes is now described in detail.

Figure 3:
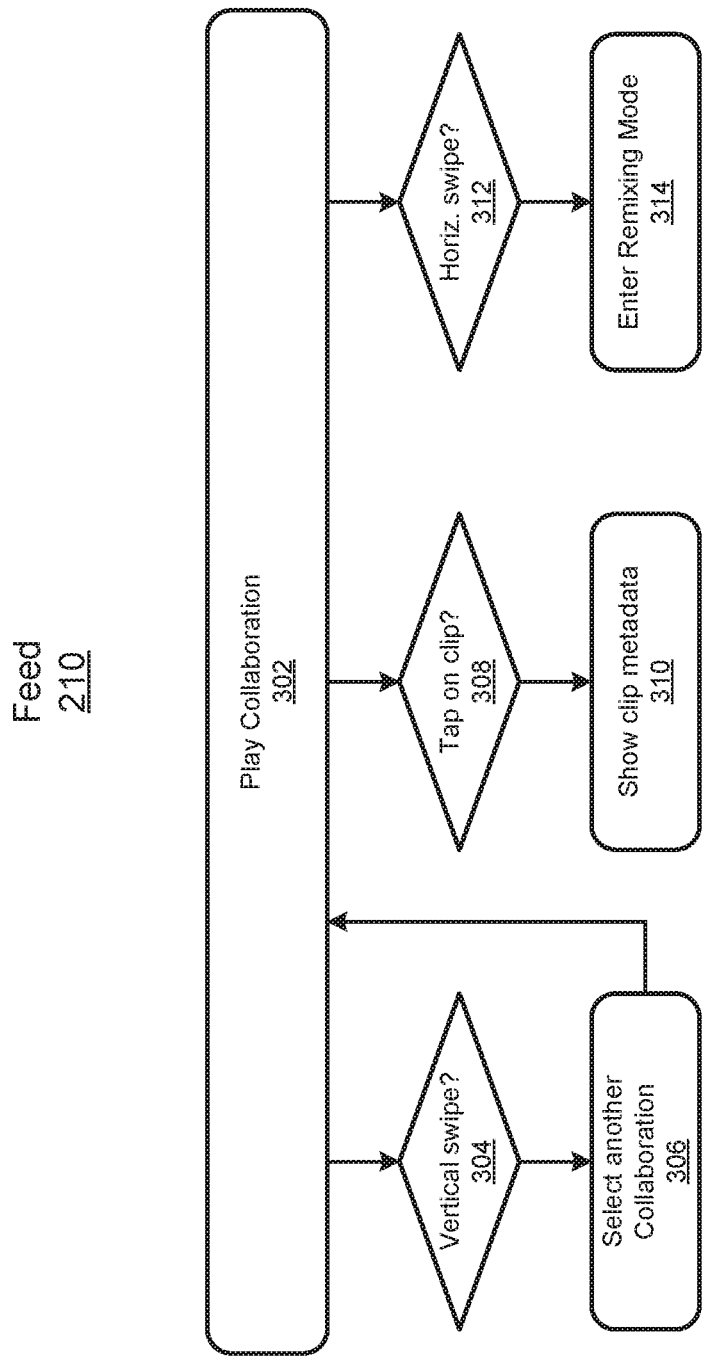
FIG. 3 depicts a process for a feed mode of a music video collaboration tool according to some embodiments of the disclosed technology.

FIG. 3 depicts a process 300 for a feed mode of a music video collaboration tool according to some embodiments of the disclosed technology. The process 300 may be performed by one or more elements of the example system 100 of FIG. 1. Referring to FIG. 3, the process 300 may include playing a collaboration, at 302. Playing a collaboration may include looping (that is, repeatedly and continuously playing) one or more music video clips associated with a particular piece of music. When the collaboration includes multiple music video clips, all of the music video clips may be associated with the same piece of music, may be of the same duration and tempo, and may be played in unison, that is, synchronously. For example, all of the music video clips in the collaboration may be 15 seconds in duration and may all have a tempo of 120 beats per minute. And all of the music video clips in the collaboration may start and stop at the same places in the piece of music. With some or all these features, the music video clips of the collaboration combine to form a pleasing musical ensemble that repeats as long as the user likes. In some embodiments, the tool may create pools of songs based on underlying characteristics like tempo and key, to allow users to combine different songs to make creative mashups that sound good together. The tool may allow users to search within the app for clips according to these underlying characteristics.

FIG. 4 is an example screenshot 400 that may be produced by the collaboration tool in the feed mode according to some embodiments of the disclosed technology. In the example of FIG. 4, a collaboration 402 is shown that includes three music video clips looping together: a person playing a synthesizer, at 404; a person singing, at 406; and a person playing a keyboard, at 408. In the described embodiments, the collaborations have three video clips, all having the same aspect ratio. In other embodiments, a collaboration may have a different number of video clips, video clips of differing aspect ratios, or both. Several icons are shown in the screenshot 400, at 410, which allow the user to share or flag the collaboration 402, for example to share the collaboration to an Instagram™ story, a Facebook™ page, and the like.

Returning to FIG. 3, the collaboration tool detects and responds to user input. For example, in response to detecting a vertical swipe on a touch screen of a smart phone, at 304, the collaboration tool selects another collaboration, at 306. In some embodiments, each time a new collaboration is selected, the tool starts to play the music video clips in the selected collaboration in unison, starting at time 0. The tool may also display gestures the user can make for controlling the tool. FIG. 5 is an example screenshot 500 that may be produced by the collaboration tool in the feed mode in response to a swipe up according to some embodiments of the disclosed technology. In response to the swipe up, the collaboration tool scrolls the display up to replace the current collaboration 402 with a new collaboration 502. The new collaboration 502 may be associated with the same piece of music, or with a different piece of music. In some embodiments, during the scrolling, the collaboration tool causes the sound of the old collaboration to fade out while the sound of the new collaboration fades in, creating a smooth blending effect.

Returning to FIG. 3, in response to detecting a tap on one of the music video clips in a collaboration, at 308, the collaboration tool shows metadata for that clip, at 310. The metadata may include, for example, the name of the piece of music associated with the collaboration, the username of the contributor of the clip, and the like. In response to detecting a horizontal swipe on one of the music video clips in a collaboration, at 312, the collaboration tool enters the remixing mode, at 314.

Figure 6:
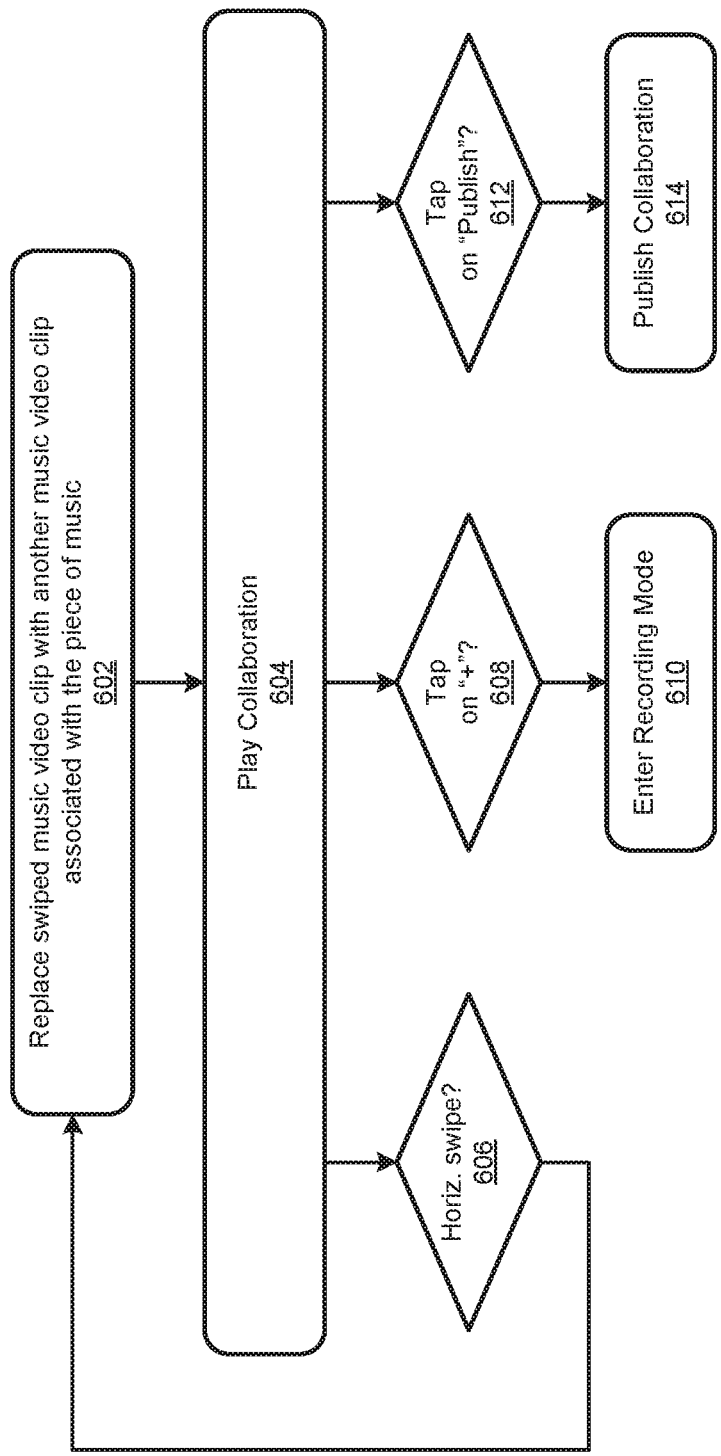
FIG. 6 depicts a process for a remixing mode of a music video collaboration tool according to some embodiments of the disclosed technology.

FIG. 6 depicts a process 600 for a remixing mode 212 of a music video collaboration tool according to some embodiments of the disclosed technology. The process 600 may be performed by one or more elements of the example system 100 of FIG. 1. Referring to FIG. 6, the process 600 may include replacing the music video clip horizontally swiped, at 312 in FIG. 3, with another music video clip associated with the same piece of music, at 602, thereby creating a new collaboration for the same piece of music. In some embodiments, the collaboration tool causes the sound of the old clip to fade out while the sound of the new clip fades in, creating a smooth blending effect. The tool then plays the collaboration, for example in the manner described above with reference to FIG. 2. The user may then horizontally swipe any of the music video clips in the looping collaboration.

Figure 7:
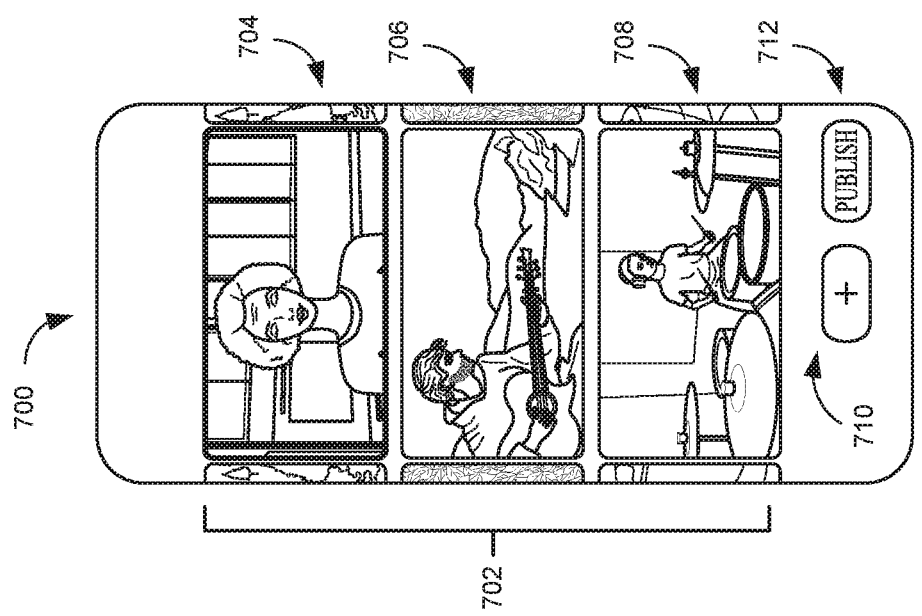
FIG. 7 is an example screenshot produced by the tool in the remixing mode according to some embodiments of the disclosed technology.

FIG. 7 is an example screenshot 700 that may be produced by the tool in the remixing mode according to some embodiments of the disclosed technology. In the example of FIG. 7, a collaboration 702 is shown that includes three music video clips looping together: a person singing, at 704; a person playing guitar, at 706; and a person playing drums, at 708. Also shown in the screenshot 700, are a "+" button 710 and a "Publish" button 712.

The tool monitors user input. Returning to FIG. 6, responsive to detecting a horizontal swipe, at 606, the collaboration tool replaces the swiped music video clip with another music video clip associated with the same piece of music, at 602, and then begins looping the new collaboration, at 604. In some embodiments, the collaboration tool causes the sound of the old clip to fade out while the sound of the new clip fades in, creating a smooth blending effect. The tool may start the collaboration at time 0, or may continue the looping from the time of the swipe. This process may be repeated as many times as the user likes.

The user may place the collaboration tool in the recording mode at any time. Responsive to detecting a tap on a "+" button 710, at 608, the collaboration tool may enter the recording mode, at 610. In some embodiments, the tool may enter the recording mode when a user swipes left on a music video clip, and select a new music video clip when a user swipes right.

The user may return to the remixing mode at any time. Responsive to detecting a tap on the "Publish" button 712, at 612, the collaboration tool publishes the collaboration, for example as described above, at 614.

Figure 8:
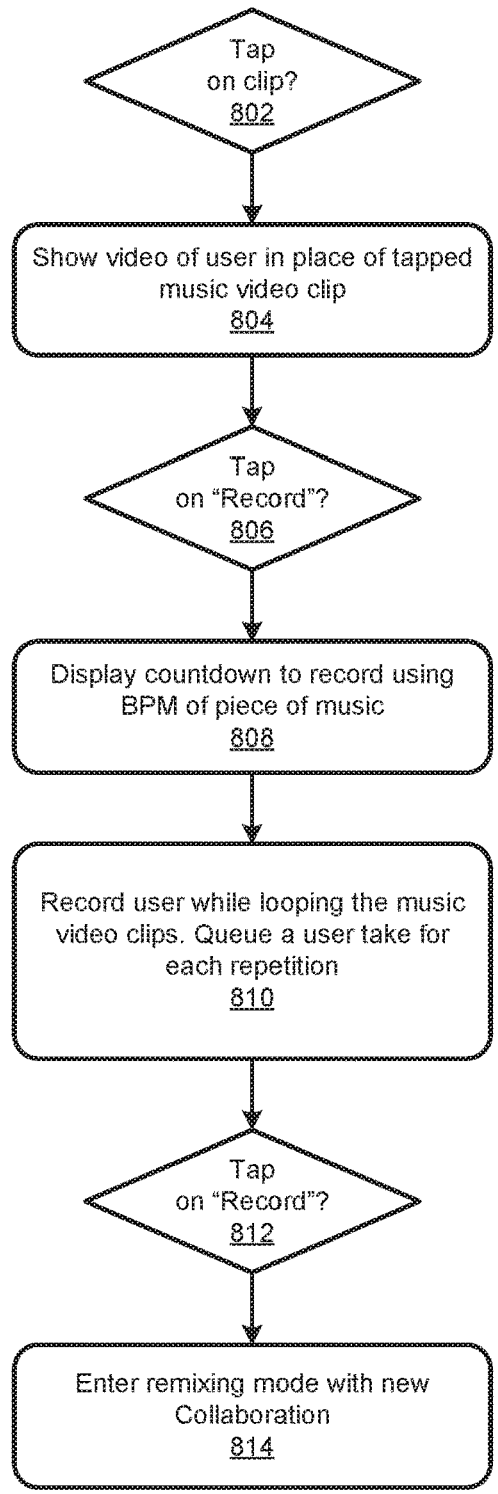
FIG. 8 depicts a process for a recording mode of a music video collaboration tool according to some embodiments of the disclosed technology.

FIG. 8 depicts a process 800 for a recording mode 214 of a music video collaboration tool according to some embodiments of the disclosed technology. The process 800 may be performed by one or more elements of the example system 100 of FIG. 1. Referring to FIG. 8, the process 800 may include detecting a tap on one of the music video clips in the collaboration, at 802. Responsive to detecting such a tap, the collaboration tool shows video of the user in place of the tapped music video clip, at 804. The video of the user may be captured, for example, by a front-facing camera of a smart phone executing the collaboration tool.

Figure 9:
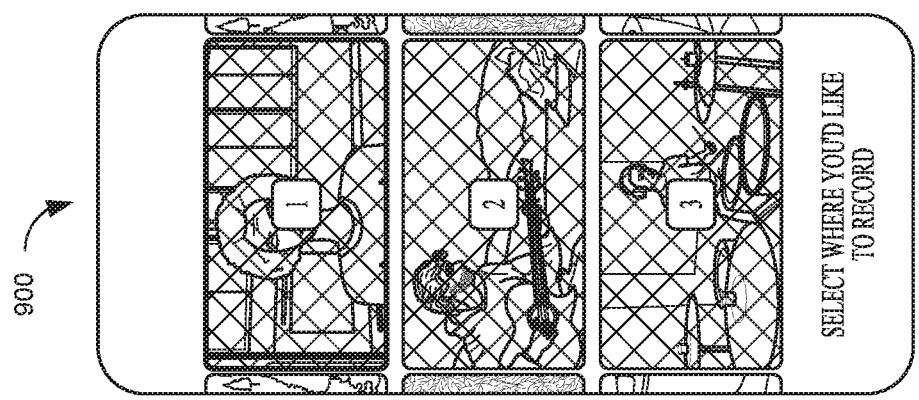
FIG. 9 is an example screenshot produced by the collaboration tool on entering the recording mode according to some embodiments of the disclosed technology.

FIG. 9 is an example screenshot 900 that may be produced by the collaboration tool on entering the recording mode 214 according to some embodiments of the disclosed technology. Referring to FIG. 9, the collaboration tool may number each of the music video clips, and may prompt the user to select which one to replace with the user's recording. In the drawings of these screenshots, cross-hatching is used to indicate parts of the screen that are dimmed.

Figure 10:
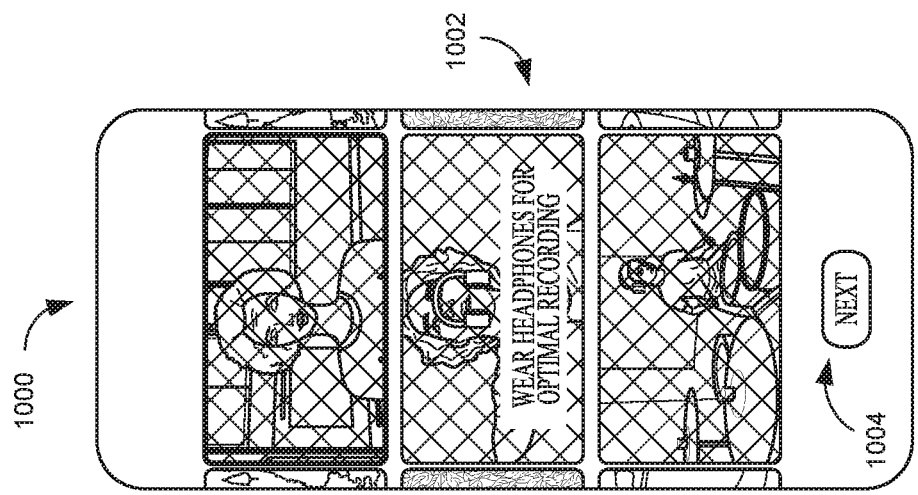
FIG. 10 is an example screenshot produced by the collaboration tool after the user has tapped one of the music video clips according to some embodiments of the disclosed technology.

FIG. 10 is an example screenshot 1000 that may be produced by the collaboration tool after the user has tapped one of the music video clips according to some embodiments of the disclosed technology. In the example of FIG. 10, the user has tapped the clip numbered 2, and the collaboration tool has replaced that clip with live video of the user. The music video clips may continue to loop during this process. To prevent feedback, the tool may prompt the user to wear headphones, at 1002. The user may proceed by tapping a "Next" button 1004.

Figure 11:
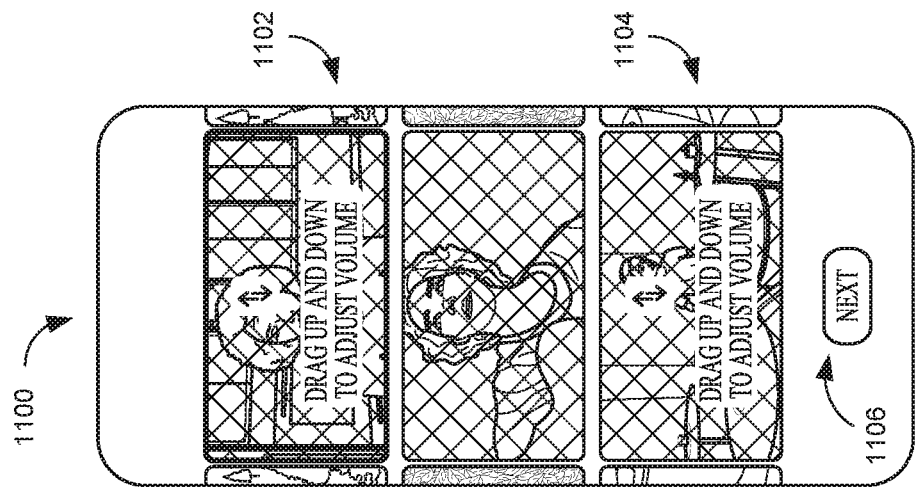
FIG. 11 is an example screenshot produced by the collaboration tool that shows the user how to adjust volumes of the clips according to some embodiments of the disclosed technology.

In some embodiments, the tool allows the user to adjust the playback volume of each of the music video clips by vertically swiping each video clip. In the remixing mode, the tool allows the user to adjust the volume of all of the clips in the collaboration, regardless of the volume used while recording. FIG. 11 is an example screenshot 1100 that may be produced by the collaboration tool at the next step according to some embodiments of the disclosed technology. Referring to FIG. 11, the collaboration tool displays prompts on each of the music video clips that show the user how to adjust their volumes, at 1102 and 1104. The user may proceed by tapping a "Next" button 1106.

In some embodiments, the collaboration tool automatically compensates for latencies introduced by a headset when recording. The latencies may be obtained from headset manufacturing specifications or other sources, may be determined empirically, or the like. In particular, during recording, the playback of images may be started later than the playback of sound, by an amount substantially equal to the input latency of the headset, so that the image and sound playbacks appear synchronized to the user. Similarly, the recorded sound may be shifted forward in time so as to be synchronized with the recorded images, and with the playback sound and images. In particular, the capture of images of the user may be started later than capture of sound of the user, by an amount substantially equal to the output latency of the headset. In this manner, the latencies introduced by the headset may be accommodated.

Figure 12:
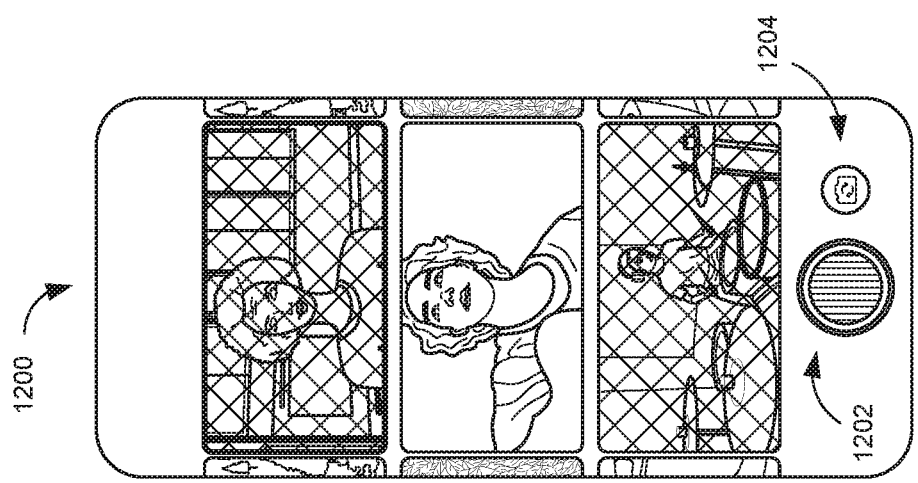
FIG. 12 is an example screenshot produced by the collaboration tool that displays a "record" button according to some embodiments of the disclosed technology.

FIG. 12 is an example screenshot 1200 that may be produced by the collaboration tool at the next step according to some embodiments of the disclosed technology. Referring to FIG. 12, the collaboration tool displays a "record" button 1202, and monitors for user input. The collaboration tool also displays a button 1204 that allows the user to switch between the front-facing camera and the rear-facing camera of the smart phone.

Figure 13:
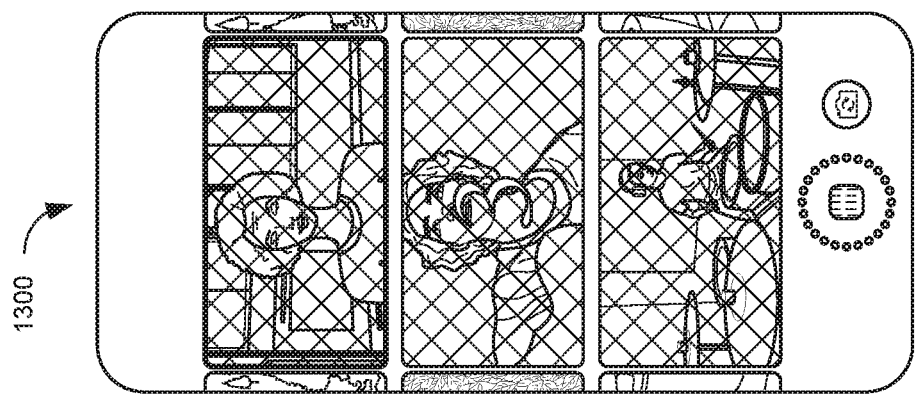
FIG. 13 is an example screenshot produced by the collaboration tool that displays a countdown according to some embodiments of the disclosed technology.

Returning to FIG. 8, responsive to detecting a tap on the "record" button 1202, at 806, the collaboration tool displays a countdown, at 808. The countdown may be timed to the beats per minute (BPM) of the piece of music, and may indicate the number of beats remaining before recording starts. FIG. 13 is an example screenshot 1300 that may be produced by the collaboration tool at this stage according to some embodiments of the disclosed technology. Referring to FIG. 13, the countdown may be shown as a numerical value superimposed over the video of the user.

Returning to FIG. 8, when the countdown elapses, the collaboration tool records video of the user while looping the music video clips, at 810. In some embodiments, the tool plays the sound of the music video clips. In some embodiments, the tool plays the piece of music. In some embodiments, the tool plays a metronome. In some embodiments, the video format is landscape, but the user may record in portrait video format. In such embodiments, the tool may display where the portrait video will be cropped during conversion to landscape video format.

Figure 14:
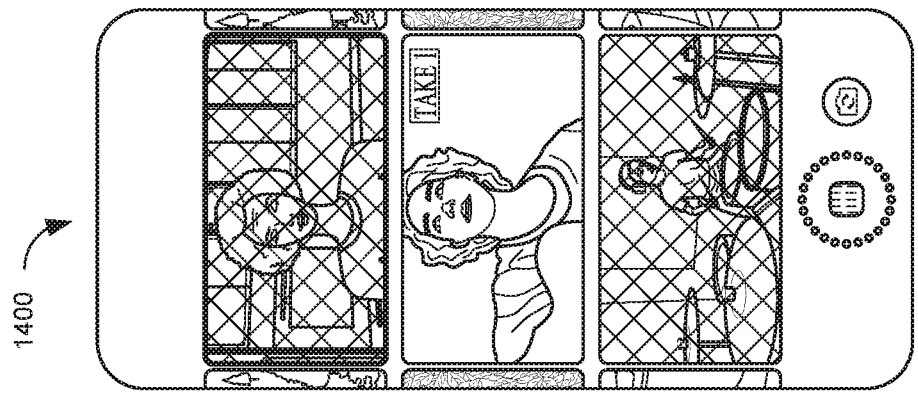
FIG. 14 is an example screenshot produced by the collaboration tool during a first take according to some embodiments of the disclosed technology.
Figure 15:
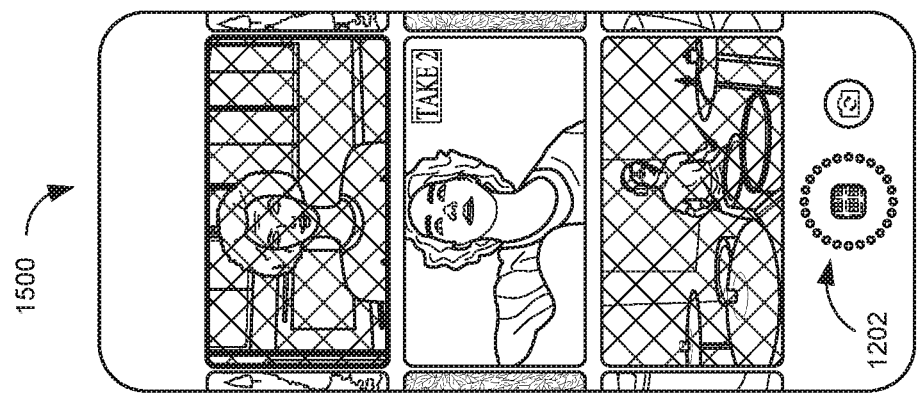
FIG. 15 is an example screenshot produced by the collaboration tool during a second take according to some embodiments of the disclosed technology.

In some embodiments, the collaboration tool automatically segments the recording of the user into takes. In particular, the collaboration tool creates a take for each loop of the music video clips. FIG. 14 is an example screenshot 1400 that may be produced by the collaboration tool during a first take, labeled "Take 1" in the screenshot 1400 according to some embodiments of the disclosed technology. FIG. 15 is an example screenshot 1500 produced by the collaboration tool during a second take, labeled "Take 2" in the screenshot 1500 according to some embodiments of the disclosed technology. In some embodiments, the tool may indicate the beat of the music by pulsing the record button 1202.

In some embodiments, the tool may allow the user to record a video longer than the duration of the music video clips. In such embodiments, the tool may prompt the user to trim the recording down to the duration, or may trim the recording to the duration automatically.

Figure 16:
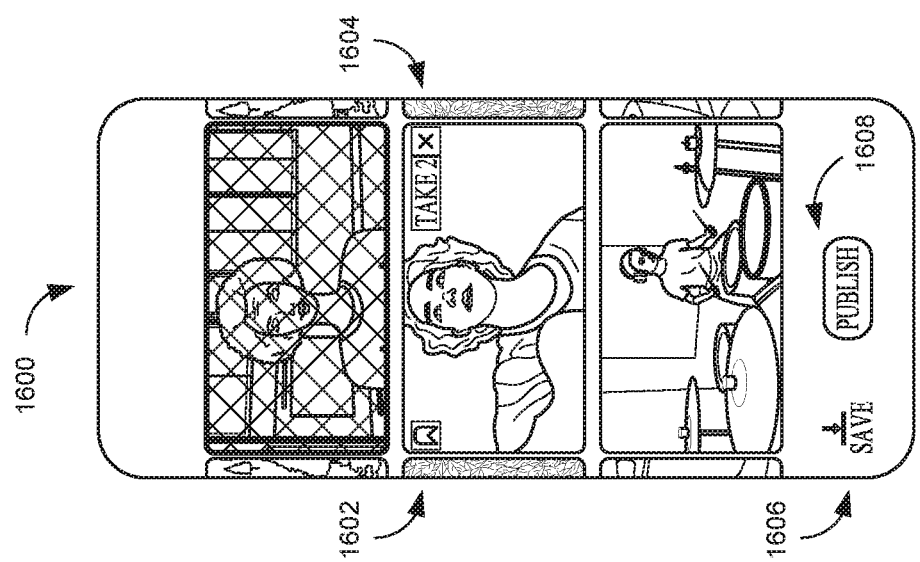
FIG. 16 is an example screenshot produced when the collaboration tool enters the remixing mode with a new collaboration displayed according to some embodiments of the disclosed technology.

The user may stop recording at any time by tapping the record button 1202. Returning to FIG. 8, responsive to detecting a tap on the "record" button 1202, at 812, the collaboration tool enters the remixing mode with the new collaboration displayed, at 814. FIG. 16 is an example screenshot 1600 that may be produced by the collaboration tool at this stage according to some embodiments of the disclosed technology. Referring to FIG. 16, the tool may allow the user to select one of the takes by horizontally swiping the takes, by bookmarking takes, for example by tapping a bookmark icon 1602, and by deleting unwanted takes, for example by tapping an "X" button 1604. The tool may allow the user to save the collaboration, for example by tapping a "Save" button 1606. The tool may allow the user to publish the collaboration, for example as described above, for example by tapping a "Publish" button 1608.

Figure 17:
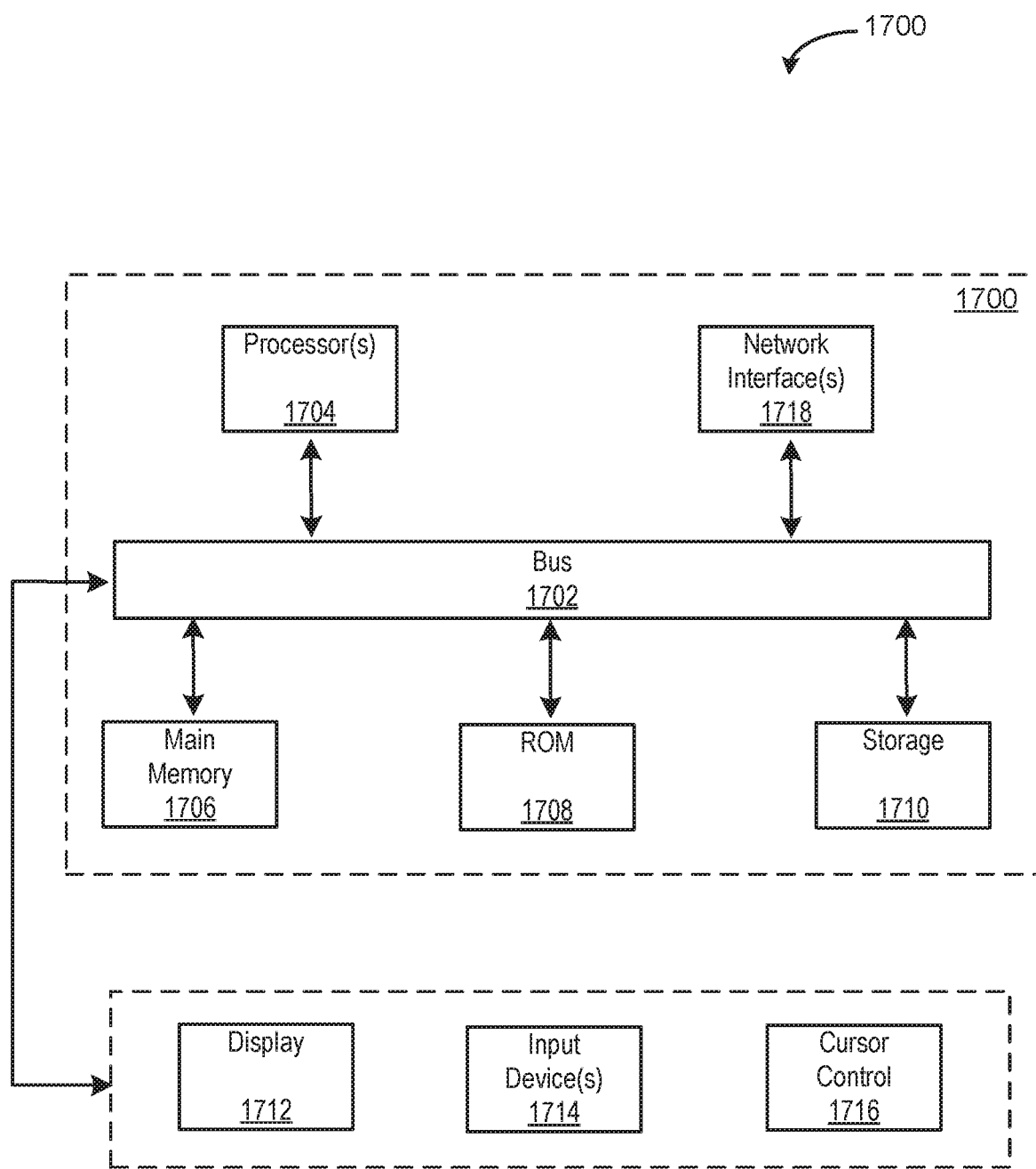
FIG. 17 depicts a block diagram of an example computer system in which various of the embodiments described herein may be implemented.

FIG. 17 depicts a block diagram of an example computer system 1700 in which various of the embodiments described herein may be implemented. The computer system 1700 may be implemented in any device. For example, the computer system 1700 may be implemented in a smartphone, tablet, laptop, automotive head unit, and the like. In some embodiments, parts of the computer system 1700 may be implemented in the cloud.

The computer system 1700 includes a bus 1702 or other communication mechanism for communicating information, and one or more hardware processors 1704 coupled with bus 1702 for processing information. Hardware processor(s) 1704 may be, for example, one or more general purpose microprocessors.

The computer system 1700 also includes a main memory 1706, such as a random access memory (RAM), cache and/or other dynamic storage devices, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions. In particular, the instructions may implement the disclosed embodiments.

The computer system 1700 further includes a read only memory (ROM) 1708 or other static storage device coupled to bus 1702 for storing static information and instructions for processor 1704. A storage device 1710, such as a magnetic disk, optical disk, or USB thumb drive (Flash drive), etc., is provided and coupled to bus 1702 for storing information and instructions.

The computer system 1700 may be coupled via bus 1702 to a display 1712, such as a liquid crystal display (LCD) (or touch screen), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. In some embodiments, the same direction information and command selections as cursor control may be implemented via receiving touches on a touch screen without a cursor.

The computing system 1700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression, or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor(s) 1704 executing one or more sequences of one or more instructions contained in main memory 1706. Such instructions may be read into main memory 1706 from another storage medium, such as storage device 1710. Execution of the sequences of instructions contained in main memory 1706 causes processor(s) 1704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1710. Volatile media includes dynamic memory, such as main memory 1706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 1702. Transmission media can also take the form of acoustic or light waves, such as those generated during radio-wave and infra-red data communications.

The computer system 1700 also includes a communication interface 1718 coupled to bus 1702. Network interface 1718 provides a two-way data communication mechanism coupling to one or more network links that are connected to one or more local networks. For example, communication interface 1718 may be an integrated services digital network (ISDN) card, cable modem, satellite modem, or a modem to provide a data communication connection to a corresponding type of telephone line. As another example, network interface 1718 may be a local area network (LAN) card to provide a data communication connection to a compatible LAN (or WAN component to communicated with a WAN). Wireless links may also be implemented. In any such implementation, network interface 1718 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic, or optical signals that carry digital data streams. The signals through the various networks and the signals on network link and through communication interface 1718, which carry the digital data to and from computer system 1700, are example forms of transmission media.

The computer system 1700 can send messages and receive data, including program code, through the network(s), network link and communication interface 1718. In the Internet example, a server might transmit a requested code for an application program through the Internet, the ISP, the local network and the communication interface 1718.

The received code may be executed by processor 1704 as it is received and/or stored in storage device 1710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain methods or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In some implementations, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the machine-readable storage medium comprising instructions to cause the hardware processor to perform a method for an electronic device comprising:
   repeatedly playing a video clip having a predetermined duration;
   capturing video of a user of the electronic device while repeatedly playing the video clip;
   automatically generating a plurality of takes of the video of the user, wherein each take has the predetermined duration of the video clip; and
   responsive to input of the user:
      selecting one of the takes, and
      synchronously playing the selected take and the video clip.

2. The medium of claim 1, the method further comprising:
   playing the captured video of the user while capturing the video of the user.

3. The medium of claim 1, the method further comprising:
   obtaining the video clip from a collaboration library hosted on a remote collaboration server.

4. The medium of claim 3, the method further comprising:
   publishing a collaboration to the collaboration library, comprising:
      uploading the selected take to the collaboration library, and
      associating the selected take with the video clip.

5. The medium of claim 1, the method further comprising:
   publishing a collaboration to social media of the user, comprising:
      adding one or more links to the social media of the user, wherein the one or more links reference the video clip and the selected take in the collaboration library.

6. The medium of claim 1, the method further comprising:
   responsive to second input of the user:
      selecting a second music video clip, wherein the second music video clip has the predetermined duration of the music video clip, wherein the music video clip and the second music video clip have the same beats per minute, and wherein the music video clip and the second music video clip are associated with a same piece of music, and
      repeatedly and synchronously playing the music video clip and the second music video clip.

7. The medium of claim 1, the method further comprising:
   responsive to second input of the user:
      replacing the music video clip with a second music video clip, wherein the music video clip is associated with a first piece of music, wherein the second music video clip is associated with a second piece of music, and wherein the first piece of music is different from the second piece of music, and
      repeatedly and continuously playing the second music video clip.

8. The medium of claim 1, wherein repeatedly playing a video clip having a predetermined duration comprises:
   starting playback of images of the video clip later than playback of sound of the video clip, by an amount substantially equal to an input latency of a headset worn by the user.

9. The medium of claim 1, wherein capturing video of a user of the electronic device comprises:
   starting capture of images of the user later than starting capture of sound of the user, by an amount substantially equal to an output latency of a headset worn by the user.

10. The medium of claim 1, the method further comprising:
    responsive to detecting a tap on the video clip, displaying metadata for that clip.

11. An electronic device, comprising:
a hardware processor; and
a non-transitory machine-readable storage medium encoded with instructions executable by the hardware processor to perform a method comprising:
    repeatedly playing a video clip having a predetermined duration;
    capturing video of a user of the electronic device while repeatedly playing the video clip;
    automatically generating a plurality of takes of the video of the user, wherein each take has the predetermined duration of the video clip; and
    responsive to input of the user:
        selecting one of the takes, and
        synchronously playing the selected take and the video clip.

12. The electronic device of claim 11, the method further comprising:
playing the captured video of the user while capturing the video of the user.

13. The electronic device of claim 11, the method further comprising:
obtaining the video clip from a collaboration library hosted on a remote collaboration server.

14. The electronic device of claim 13, the method further comprising:
publishing a collaboration to the collaboration library, comprising:
    uploading the selected take to the collaboration library, and
    associating the selected take with the video clip.

15. The electronic device of claim 11, the method further comprising:
publishing a collaboration to social media of the user, comprising:
    adding one or more links to the social media of the user, wherein the one or more links reference the video clip and the selected take in the collaboration library.

16. The electronic device of claim 11, the method further comprising:
responsive to second input of the user:
    selecting a second music video clip, wherein the second music video clip has the predetermined duration of the music video clip, wherein the music video clip and the second music video clip have the same beats per minute, and wherein the music video clip and the second music video clip are associated with a same piece of music, and
    repeatedly and synchronously playing the music video clip and the second music video clip.

17. The electronic device of claim 11, the method further comprising:
responsive to second input of the user:
    replacing the music video clip with a second music video clip, wherein the music video clip is associated with a first piece of music, wherein the second music video clip is associated with a second piece of music, and wherein the first piece of music is different from the second piece of music, and
    repeatedly and continuously playing the second music video clip.

18. The electronic device of claim 11, wherein repeatedly playing a video clip having a predetermined duration comprises:
starting playback of images of the video clip later than playback of sound of the video clip, by an amount substantially equal to an input latency of a headset worn by the user.

19. The electronic device of claim 11, wherein capturing video of a user of the electronic device comprises:
starting capture of images of the user later than starting capture of sound of the user, by an amount substantially equal to an output latency of a headset worn by the user.

20. The electronic device of claim 11, the method further comprising:
responsive to detecting a tap on the video clip, displaying metadata for that clip.

21. A computer-implemented method for an electronic device, the method comprising:
repeatedly playing a video clip having a predetermined duration;
capturing video of a user of the electronic device while repeatedly playing the video clip;
automatically generating a plurality of takes of the video of the user, wherein each take has the predetermined duration of the video clip; and
responsive to input of the user:
    selecting one of the takes, and
    synchronously playing the selected take and the video clip.

22. The computer-implemented method of claim 21, further comprising:
playing the captured video of the user while capturing the video of the user.

23. The computer-implemented method of claim 21, further comprising:
obtaining the video clip from a collaboration library hosted on a remote collaboration server.

24. The computer-implemented method of claim 23, further comprising:
publishing a collaboration to the collaboration library, comprising:
    uploading the selected take to the collaboration library, and
    associating the selected take with the video clip.

25. The computer-implemented method of claim 21, further comprising:
publishing a collaboration to social media of the user, comprising:
    adding one or more links to the social media of the user, wherein the one or more links reference the video clip and the selected take in the collaboration library.

26. The computer-implemented method of claim 21, the method further comprising:
responsive to second input of the user:
    selecting a second music video clip, wherein the second music video clip has the predetermined duration of the music video clip, wherein the music video clip and the second music video clip have the same beats per minute, and wherein the music video clip and the second music video clip are associated with a same piece of music, and
    repeatedly and synchronously playing the first and second music video clips.

27. The computer-implemented method of claim 21, the method further comprising:
responsive to second input of the user:
    replacing the music video clip with a second music video clip, wherein the second music video clip is associated with a second piece of music, and wherein the first piece of music is different from the second piece of music, and repeatedly and continuously playing the second music video clip.

28. The computer-implemented method of claim 21, wherein repeatedly playing a video clip having a predetermined duration comprises:

starting playback of images of the video clip later than playback of sound of the video clip, by an amount substantially equal to an input latency of a headset worn by the user.

29. The computer-implemented method of claim 21, wherein capturing video of a user of the electronic device comprises:

starting capture of images of the user later than starting capture of sound of the user, by an amount substantially equal to an output latency of a headset worn by the user.

30. The computer-implemented method of claim 21, further comprising:

responsive to detecting a tap on the video clip, displaying metadata for that clip.

\* \* \* \* \*